United States Patent
Laviron et al.

(10) Patent No.: US 12,044,784 B2
(45) Date of Patent: Jul. 23, 2024

(54) DEVICE AND METHOD FOR AUTONOMOUSLY LOCATING A MOBILE VEHICLE ON A RAILWAY TRACK

(71) Applicant: GTS FRANCE, Velizy Villacoublay (FR)

(72) Inventors: Philippe Laviron, Velizy-Villacoublay (FR); Cédrik Ferrero, Pessac (FR); Yuxiang Song, Pessac (FR); Jennifer Simeon, Pessac (FR)

(73) Assignee: GTS FRANCE, Velizy Villacoublay (FR)

( * ) Notice: Subject to any disclaimer, the term of this patent is extended or adjusted under 35 U.S.C. 154(b) by 176 days.

(21) Appl. No.: 17/642,694

(22) PCT Filed: Sep. 12, 2019

(86) PCT No.: PCT/FR2019/000146
§ 371 (c)(1),
(2) Date: Mar. 13, 2022

(87) PCT Pub. No.: WO2021/048471
PCT Pub. Date: Mar. 18, 2021

(65) Prior Publication Data
US 2022/0326395 A1 Oct. 13, 2022

(51) Int. Cl.
*G01S 19/50* (2010.01)
*G01S 19/13* (2010.01)

(52) U.S. Cl.
CPC ............. *G01S 19/50* (2013.01); *G01S 19/13* (2013.01)

(58) Field of Classification Search
CPC ........... G01S 19/50; G01S 19/13; G01S 19/22
See application file for complete search history.

(56) References Cited

U.S. PATENT DOCUMENTS 6,313,786 B1 * 11/2001 Sheynblat ............... G01S 19/24
  701/472
2009/0213912 A1 * 8/2009 Brenner .................. G01S 19/30
  375/150

(Continued)

FOREIGN PATENT DOCUMENTS

EP         2386459 A2 * 11/2011 ............. B61L 25/025
GB         2 480 102 A    11/2011
KR     2016-0121453 A    10/2016

OTHER PUBLICATIONS

Jiang, Shuxian, et al., GNSS NLOS Signal Modeling and Quantification Method in Railway Urban Canyon Environment, presented at IEEE Intelligent Vehicles Symposium, Paris, France, Jun. 9-12, 2019. (Year: 2019).*

(Continued)

*Primary Examiner* — Keith D Bloomquist
(74) *Attorney, Agent, or Firm* — BakerHostetler (57) ABSTRACT

The embodiments of the invention provide a method for locating, in a railroad frame of reference, a mobile vehicle traveling on railroad tracks of a railroad network. The method determines one or more railroad track segments on which the mobile vehicle is likely to be located by querying a cartographic database based on at least one location parameter. The cartographic database comprises data representing a vectorial description of at least one railroad track of the railroad network and data representing a description of one or more objects of the environment adjacent to the railroad tracks of the railroad network likely to interfere with the navigation signals received by the mobile vehicle. The method includes a step of generating the cartographic database comprising the steps of: receiving a measurement point cloud classified and geolocated in a coordinate system, the measurement point cloud being associated with the railroad network and with the adjacent environment, determining the topology of the railroad network based on geolocated and classified measurement points associated with the railroad network and a plurality of additional elements of the railroad network, modeling the geometry of the railroad tracks of the railroad network as a plurality of modeled railroad track segments, determining, from geolocated and classified mea- (Continued)

surement points associated with the adjacent environment, one or more adjacent objects, each of the adjacent objects being associated with one or more modeled railroad track segments, identifying, for each association between an adjacent object and one or more modeled railroad track segments, information representing the interference affecting the navigation signals.

13 Claims, 9 Drawing Sheets

(56) References Cited

U.S. PATENT DOCUMENTS

| | | | | |
|---|---|---|---|---|
| 2010/0283673 A1* | 11/2010 | Farrokhi | ............... | G01S 19/22 342/357.46 |
| 2011/0090117 A1* | 4/2011 | Rodriguez | ............ | G01S 19/428 342/357.61 |
| 2011/0182330 A1* | 7/2011 | Olson | ................. | H04B 1/7105 375/E1.001 |
| 2014/0176711 A1* | 6/2014 | Kirchner | .............. | B61L 25/025 348/148 |
| 2017/0067999 A1* | 3/2017 | Chhokra | ................ | G01S 19/42 |

OTHER PUBLICATIONS

Jinag, et al., "GNSS NLOS Signal Modeling and Quantification Method in Railway Urban Canyon Environment", 2019 IEEE Intelligent Vehicles Symposium (IV), Jun. 2019.

* cited by examiner

DEVICE AND METHOD FOR AUTONOMOUSLY LOCATING A MOBILE VEHICLE ON A RAILWAY TRACK

CROSS-REFERENCE TO RELATED APPLICATION

This application is a National Stage of International patent application PCT/FR2019/000146, filed on Sep. 12, 2019, the disclosure of which is incorporated by reference in its entirety.

FIELD OF THE INVENTION

The present invention generally relates to location systems and in particular to a device and a method for autonomously locating a mobile vehicle in a railroad network comprising at least one railroad using a cartographic database.

BACKGROUND

Locating a railroad vehicle traveling on railroad tracks of a railroad network is generally performed in a non-autonomous manner using sensors, called track sensors, deployed all along the railroad tracks. A railroad vehicle can be located using an odometry technique between two successive track sensors. Locating can be performed in a railroad reference system by determining the section of the railroad on which the railroad vehicle is located. The location returned can be qualified as trustworthy if the risk that the railroad vehicle is not on the section in question is lower than an acceptable limit. The reliability of a location technique combining track sensors and odometry is higher the smaller the distance separating two successive track sensors. However, such a known location technique is expensive to deploy and involves high maintenance costs.

In other existing approaches, integrated and autonomous location systems that do not require the deployment of track sensors have been proposed. The location provided by such location systems may be produced in a terrestrial reference frame by means of a location device fitted to the railroad vehicle which receives and processes navigation signals transmitted by geolocation satellites such as GPS (Global Positioning System) and GNSS (Global Navigation Satellite System) satellites. The transition from a location in a terrestrial reference to a location in a railroad reference can be performed using a cartographic database of the railroad network. Such a cartographic database comprises the geographical coordinates of various elements of the railroad network such as the railroad tracks. The cartographic database may also comprise a description of certain elements of the environment adjacent to the railroad network likely to interfere with the navigation signals received by the railroad vehicle. The trustworthiness of such autonomous location systems is therefore dependent on the trustworthiness of the cartographic database used.

Constructing a trustworthy cartographic database requires that topographic measurements be performed on the railroad network and on its adjacent environment before processing the measurement point cloud thus obtained in order to model elements of the railroad network and certain objects of the adjacent environment. Such processing requires that each measurement point be classified according to whether it characterizes the railroad network or its adjacent environment.

The measurement points are usually classified manually. However, such manual classification is complex to perform and costly in time. The classified points must then be processed by devices whose resources in terms of storage memory and computing speed are often insufficient to efficiently handle the large volume of data (of the order of a terabyte) corresponding to the classified points. This results in a decrease in the reliability and in the response time of the vehicle location device using such a database.

Modeling the tracks of a railroad network is often done using computer-aided design (CAD) tools originally designed to model road infrastructure. A railroad application requires sub-decameter precision when acquiring topographic data and a protective radius characterizing the error ellipse of a few meters. However, the requirements of a railroad application in terms of trustworthiness are very high (of the order of $10^{-7}$ failures per hour). Moreover, modeling the railroad tracks is not enough to reconstruct the topology of the railroad network as it requires that other elements of the railroad network, such as junctions, be identified. Design tools require higher expertise and know-how from the user. A number of manipulations are needed to extract the information from acquisition measurements.

In addition, the existing tools do not make it possible to effectively reconstruct the topology of a railroad network from a geolocated and classified measurement point cloud, taking into account the specificities of the railroad application.

To model certain objects of the environment adjacent to the railroad network, there are learning-based tools capable of extracting and modeling these objects from a geolocated and classified measurement point cloud. Such tools allow objects of the adjacent environment to be recognized. However, the functionalities of such tools are limited to extracting objects of the adjacent environment and do not make it possible to analyze their effects on the navigation signals received by a railroad vehicle moving close by them.

There is therefore a need for an improved device and method for locating vehicles in a railroad network.

SUMMARY OF THE INVENTION

The invention aims to improve the situation by proposing a method for locating, in a railroad reference frame, a mobile vehicle traveling on railroad tracks of a railroad network, comprising the steps of:

determining location parameters associated with the position of the mobile vehicle in a geographical reference frame based on a plurality of navigation signals received by the mobile vehicle, determining one or more railroad track segments on which the mobile vehicle is likely to be located by querying a cartographic database based on at least one of the location parameters, locating the mobile vehicle based on the railroad track segments provided by the cartographic database and at least one of the location parameters, the cartographic database comprising data representing a vectorial description of at least one railroad track of the railroad network and data representing a description of one or more objects of the environment adjacent to the railroad tracks of the railroad network likely to interfere with the navigation signals received by the mobile vehicle, the method for generating the cartographic database comprising the steps of:

receiving a measurement point cloud classified and geolocated in a coordinate system, the measurement point cloud being associated with the railroad network and with the adjacent environment, determining the topology of said railroad network based on geolocated and classified measurement points associated with the railroad network and a plurality of additional elements of said railroad network, modeling the geometry of the railroad tracks of said railroad network as a plurality of modeled railroad track segments, determining, from geolocated and classified measurement points associated with the adjacent environment, one or more adjacent objects, each of said adjacent objects being associated with one or more modeled railroad track segments, identifying, for each association between an adjacent object and one or more modeled railroad track segments, information representing the interference affecting the navigation signals.

In one embodiment, the method may further comprise a step of saving the elements comprising the modeled railroad track segments, the additional elements of the railroad network, and/or the adjacent objects in files having a given representation format.

Additional elements of the rail network may comprise junctions and stopping points.

In one embodiment, the geolocated and classified measurement point cloud may be received from at least one mobile topography system associated with a hybrid geolocation system comprising a location device associated with an inertial unit.

The location parameters may comprise a position in three dimensions, a movement speed and/or an orientation parameter.

Advantageously, the step of determining the topology of the railroad network may then comprise the steps of:

transforming elements of said geolocated point clouds associated with the railroad network into a plurality of geospatial vectors, each of the geospatial vectors corresponding to a railroad track, subdividing the railroad network by defining, for each geospatial vector, a plurality of elements comprising junctions and/or stopping points.

In one embodiment, each railroad track may comprise two lines of rails, while the step of vectorizing said geolocated and classified measurement point cloud associated with the ground and with the railroad tracks as a plurality of geospatial vectors may comprise the steps of:

identifying the points of said geolocated point cloud that are associated with a chosen rail line of the railroad track, subsampling the identified points using a predefined subsampling factor, grouping the subsampled points into a plurality of subsets of points, two successive subsets of points sharing at least one measurement point, calculating the average position in three dimensions of each subset of points using a moving average, creating a vector associated with the chosen rail line comprising the calculated average positions in three dimensions, eliminating those components of the created vector which are likely to be affected by noise from an automated classification, which provides a geospatial vector, determining the one or more vectors associated with the other rail line of the railroad track based on the geospatial vector determined for the selected rail, and calculating the geospatial vector associated with the median axis of the railroad track.

In particular, each geospatial vector may further comprise orientation, slope and cant measurements extracted from each subset of identified points.

In one embodiment, the subdivision step may use a graph comprising a set of edges, and nodes connecting the edges, the edges representing railroad tracks associated with geospatial vectors and the nodes representing junctions or stopping points on the rail network.

The step of modeling the geometry of the median axis of a railroad track represented by a geospatial vector may comprise one or more iterations of the following steps:

i. determining a current analytical model of the geometry of the median axis of the railroad track represented by a geospatial vector using at least one analytical equation, ii. measuring the standard deviation between the median axis of the railroad track and the associated curve returned by the analytical model, iii. dividing the geospatial vector into two elements, if the measured standard deviation is greater than a predefined error threshold, steps i. to iii. being iterated for as long as a standard deviation between the analytical model and the geospatial vector is greater than the predefined error threshold.

In one embodiment, the method may further comprise determining a network format corresponding to the railroad network by associating each modeled railroad track segment with one or more elements of the railroad network.

The step of defining adjacent objects and of associating between an adjacent object and one or more modeled segments may comprise the steps of:

subsampling the measurement points associated with the adjacent environment by a predefined subsampling factor, transforming the subsampled measurement points into one or more adjacent objects, associating the adjacent objects with the modeled railroad track segments.

Navigation signal propagation properties may be assigned to each association between an adjacent object and one or more modeled segments as a function of a plurality of parameters comprising the height of the adjacent object and the distance separating the adjacent object from the median axis of the modeled segment.

Also proposed is a system for locating, in a railroad reference frame, a mobile vehicle traveling on railroad tracks of a railroad network comprising a location device configured for:

determining location parameters associated with the position of the mobile vehicle in a geographical reference frame based on a plurality of navigation signals received by the mobile vehicle, determining one or more railroad track segments on which the mobile vehicle is likely to be located by querying a cartographic database based on at least one of the location parameters, locating the mobile vehicle based on the railroad track segments provided by the cartographic database and at least one of the location parameters.

The cartographic database comprises data representing a vectorial description of at least one railroad track of the railroad network and data representing a description of one or more objects of the environment adjacent to the railroad tracks of the railroad network likely to interfere with the navigation signals received by the mobile vehicle. The location system further includes a unit for generating cartographic databases comprising:

a receiving module configured to receive a measurement point cloud classified and geolocated in a coordinate system, the measurement point cloud being associated with the railroad network and with the adjacent environment, a topology-determining module configured to determine the topology of said railroad network based on geolocated and classified measurement points associated with the railroad network and a plurality of additional elements of said railroad network, a modeling module configured to model the geometry of the railroad tracks of said railroad network as a plurality of modeled railroad track segments, a module for determining adjacent objects configured to determine, from geolocated and classified measurement points associated with the adjacent environment, one or more adjacent objects, each of the adjacent objects being associated with one or more modeled railroad track segments, an identifying module configured to identify, for each association between an adjacent object and one or more modeled railroad track segments, information representing the interference affecting the navigation signals.

The embodiments of the invention thus provide a method and a device for allowing the precise and trustworthy location of a mobile vehicle traveling on railroad tracks of a railroad network. Such location can be guaranteed at any point in the rail network and at any time. It is advantageously performed with an optimal response time and reduced computational complexity by virtue of taking into account the particularities of railroad networks in terms of precision and trustworthiness.

BRIEF DESCRIPTION OF THE DRAWINGS

Other features and advantages of the invention will become apparent with the aid of the description which follows and the figures of the appended drawings, in which.

DETAILED DESCRIPTION

Figure 1:
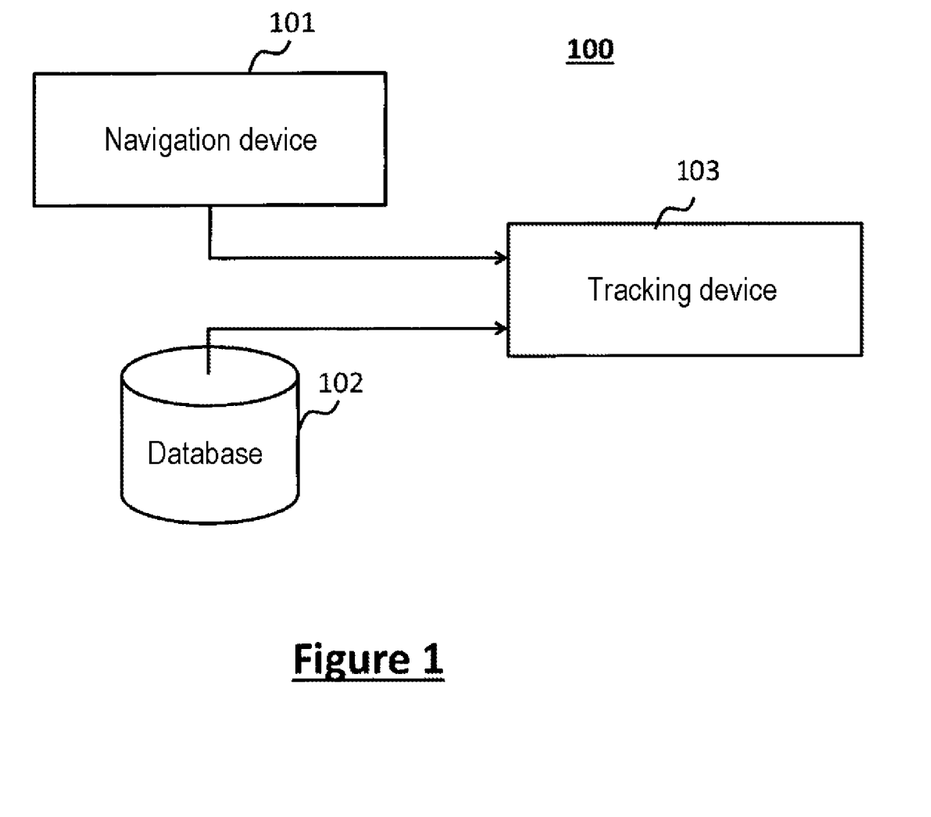
FIG. 1 shows a system for locating mobile vehicles traveling in a railroad network according to embodiments of the invention.

FIG. 1 shows an autonomous location and navigation system 100 in which an integrated cartographic database 102 can be used according to some embodiments of the invention.

The autonomous location and navigation system 100 can be used in a railroad vehicle traveling on a railroad track of a railroad network in order to instantaneously and precisely provide the location of the railroad vehicle as well as navigation data usable for navigation in autonomous mode. More generally, the autonomous location and navigation system 100 can be used in any type of mobile vehicle traveling on a path restricted by a dedicated track, such as a train.

The autonomous location and navigation system 100 may further comprise a location device 101 and a tracking device 103.

The location device 101 may comprise a navigation signal receiver configured to receive navigation signals transmitted by location systems such as GPS or GNSS systems. The location device 101 can use such signals to determine location parameters associated with the mobile vehicle. The location parameters may comprise position data representing the position in three dimensions of the vehicle in a global geographical reference frame linked to the Earth, and/or the orientation of the vehicle and/or the speed of movement of the vehicle. For each position in three dimensions determined, the location device 101 can associate an error ellipse and/or an alarm signal which can be triggered if a condition relating to the position determined with respect to the ellipse is met. In one embodiment, the alarm signal is triggered if the position in question of the vehicle is located in the error ellipse. The alarm signal can be stopped when the position in question of the vehicle moves out of the error ellipse after a predefined period of time.

The location device 101 may further comprise an inertial unit configured to provide less precise location parameters than those determined from navigation signals, without using any external information. The inertial unit can be used in the absence of available navigation signals in order to allow continuous location of the mobile vehicle. Such a situation may arise, for example, when a mobile vehicle is moving through a tunnel. The inertial unit can also be used in the event of deterioration in the quality of navigation signals. Such deterioration may originate from multipath propagation caused by objects in the environment adjacent to the mobile vehicle. Objects in the adjacent environment that may induce such deterioration include, for example, buildings, vegetation, traffic signs, etc.

In one embodiment of the invention, the location device 101 may additionally comprise a module for hybridizing the location parameters provided by the navigation signal receiver and by the inertial unit, respectively.

The integrated cartographic database 102 is configured to store a set of data describing the topology of the railroad network (hereinafter referred to as "topology description data"), comprising at least one railroad track, in which a mobile vehicle can travel. The data of the integrated cartographic database 102 may further include data describing the format of such a network (hereinafter referred to as "network format description data"). The topology of the railroad network and the network format are key elements of autonomous navigation for mobile vehicles. As used herein, the term "autonomous navigation" refers to navigation in a vehicle without an active driver.

The integrated cartographic database 102 may further comprise data describing certain objects in the environment adjacent to the tracks of the railroad network that are likely to interfere with navigation signals received by the mobile vehicle (hereinafter referred to as "environmental object description data").

The topography description data may comprise data identifying some of the constituent elements of the railroad network that is associated with the database such as rail tracks, junctions and/or stopping points (also called "termini"). The identification data associated with the constituent elements of the network may also comprise interconnection data representing the interconnections between the various constituent elements.

Each element of the railroad network described by data from the database 102 can be associated with location data in the global geographical reference frame linked to the Earth that is associated with the location device 101.

The network format corresponding to a railroad network may represent a set of possible routes in the railroad network, each route comprising a set of segments corresponding to a railroad track of the network, for a given departure point and a given arrival point. The network format can be determined based on chaining features in the network by identifying, for example, for each railroad track connecting a departure point and an arrival point, those railroad track segments which constitute it and the junctions encountered by a mobile vehicle traveling in the rail network. A junction is defined with respect to a direction of travel and can be viewed as a zero-length segment that has one entry and two exits.

The tracking device 103 can be configured to determine the location of the mobile vehicle in a railroad reference frame by identifying the segment of railroad on which the mobile vehicle is located. The tracking device can receive the location parameters provided by the location device 101 and then query the integrated cartographic database 102 using an input request comprising at least some of these parameters in order to identify the candidate railroad track segments on which the mobile vehicle may be located. The tracking device 103 can use navigation rules in the railroad network to determine the segment of railroad track on which the mobile vehicle is located. The tracking device 103 can also be configured to determine the abscissa of the mobile vehicle on the current railroad track segment in the reference frame in question.

The embodiments of the invention advantageously allow the integrated database 102 to be generated semi-automatically.

Figure 2:
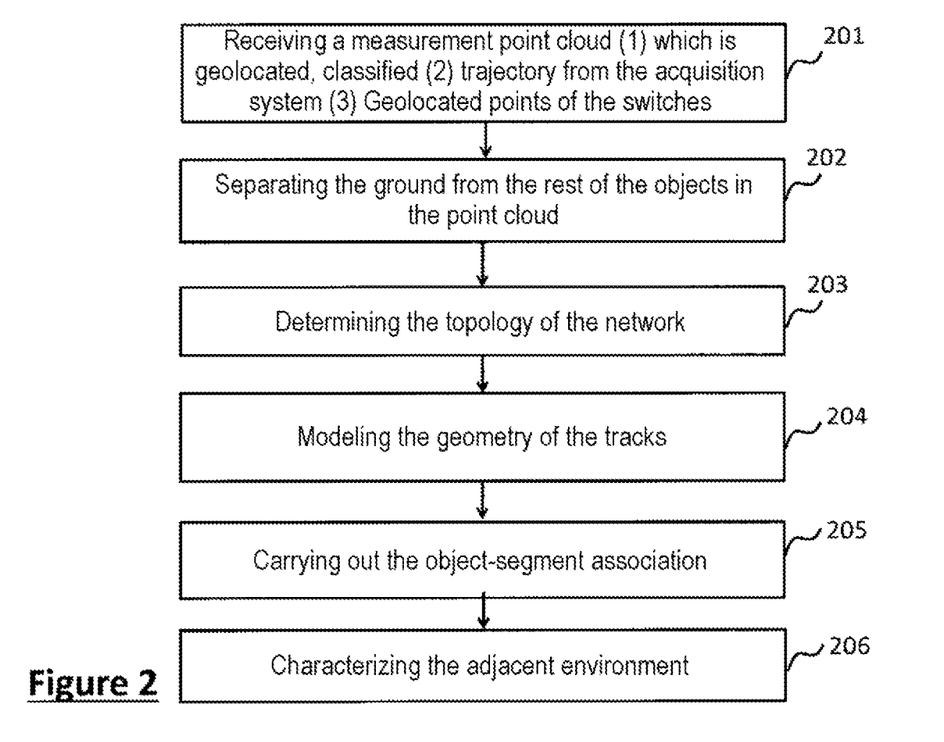
FIG. 2 is a flowchart showing the steps of the method for generating the cartographic database.

FIG. 2 illustrates the method for generating the database implemented to generate the integrated cartographic database 102, according to some embodiments of the invention. In step 201, a geolocated and classified measurement point cloud describing in three dimensions a railroad network and its adjacent environment is received. Each measurement point can be geolocated in the sense that the location of this measurement point in a given measurement reference frame is known with precision. Such a measurement reference frame can be the terrestrial measurement reference frame. The coordinates of the measurement points can be provided in a GPS/GNSS trace file. The geolocated measurement point cloud can be obtained from topographic surveys previously carried out by means of one or more topography techniques. Examples of topography techniques include, but are not limited to, mobile mapping system, or MMS, topography, satellite topography and conventional topography implementing a transportable topography device. MMSs have the advantage of allowing measurements of very high quality in terms of resolution (smaller than 10 centimeters) with increased geolocation quality by virtue of the use of a hybrid geolocation system comprising a GPS/GNSS location device associated with an inertial unit. MMSs can use a plurality of optical cameras and laser remote-sensing devices to construct a three-dimensional model of the analyzed environment by implementing dedicated tools and vision algorithms.

Each geolocated measurement point can further be classified into at least two groups of geolocated measurement point clouds comprising a group of point clouds associated with the ground and the rail network, and a group of point clouds associated with the adjacent environment.

Such a classification into two groups of measurement point clouds can be performed by applying one or more classification algorithms. Such classification algorithms can be executed on a computer system or on a cloud computing service. Such a classification of geolocated measurement points saves time and computing resources and increases precision in comparison with conventional classification approaches which are carried out manually by operators.

In step 201, the coordinates of certain constituent elements of the railroad network, in the same measurement reference system as the geolocated measurement point cloud, can also be received. Such constituent elements may comprise junctions and stopping points.

In step 201, a subsampling operation can be applied to the received geolocated and classified measurement point cloud. Such a subsampling operation makes it possible to reduce the size of the geolocated and classified measurement point cloud processed by the method for generating databases. The subsampling factor associated with such a subsampling operation may be the same for the three dimensions of the geolocated and classified measurement point cloud. Alternatively, a subsampling factor may be associated with each dimension of the measurement point cloud.

In step 202, the geolocated measurement point cloud associated with the ground and with the railroad network can be separated from the geolocated measurement point cloud associated with the environment adjacent to the railroad network. Such a separation advantageously allows parallel processing of two geolocated measurement point clouds.

In step 203, the topology of the railroad network is determined based on the geolocated and classified measurement point cloud associated with the ground and with the rails. The step of determining the topology of the railroad network may comprise identification of the railroad tracks constituting the railroad network, of the junctions and of the stopping points. The railroad tracks can be modeled by geospatial vectors. Each of the geospatial vectors may comprise the coordinates in a measurement reference frame of the median axis of the associated railroad.

The junctions can be identified by analyzing the intersections between the various railroad tracks identified as modeled by the geospatial vectors. The stopping points can be identified by detecting the ends of the identified railroad tracks. According to embodiments of the invention, the locations in the measurement reference frame of the junctions and of the stopping points can be provided by step 201.

In step 204, the railroad tracks, represented by the geospatial vector associated therewith, are received in order to model the geometry of the railroad tracks using standard or common geometric shapes. Modeling the geometry of a railroad track may comprise subdividing the railroad track into multiple track segments. An analytical equation can be associated with each track segment to describe its geometry. An association between each modeled railroad track segment and the elements of the railroad network (other segments, junction, stopping points, etc.) to which it is connected can be determined, which defines the format of the railroad network.

Step 205 is performed on the basis of the geolocated measurement point cloud associated with the adjacent environment and the modeled railroad track segments are received. The environment adjacent to the railroad network may have a width of a hundred meters centered on the railroad tracks of the railroad network. Such an environment may comprise stations, platforms, bridges, tunnels, etc. The measurement point cloud associated with the adjacent environment can be transformed into a plurality of objects of the adjacent environment. The objects of the adjacent environment can be modeled using standard or common three-dimensional geometric shapes by determining, for each object of the adjacent environment modeled, a set of geometric parameters comprising the dimensions of the object and the distances separating the object from the modeled railroad track segments. In step 205, an association is determined between each railroad track segment modeled and objects of the adjacent environment modeled that are likely to interfere with navigation signals received by a mobile vehicle traveling on the railroad track segment in question.

In step 206, the modeled railroad track segments, the identified objects of the adjacent environment and the associations between the segments and the objects as provided by step 205 are used to characterize the risk of propagation affecting the navigation signals received by a mobile vehicle moving on the railroad track segments. Characterization of the risk of propagation can be performed at several points on each segment of modeled railroad track associated with one or more objects of the adjacent environment. Characterization of the risk of propagation provides propagation risk parameters such as, for example and without limitation, the type of propagation risk and the dimensions of the mobile vehicle associated with the identified propagation risk.

According to one embodiment of the invention, elements of the cartographic database can be described in one or more description files having a chosen representation format such as XML format. Such elements of the database may comprise modeled railroad track segments, junctions, stopping points, objects of the adjacent environment, and associations between the modeled segments and the objects of the adjacent environment.

Figure 3:
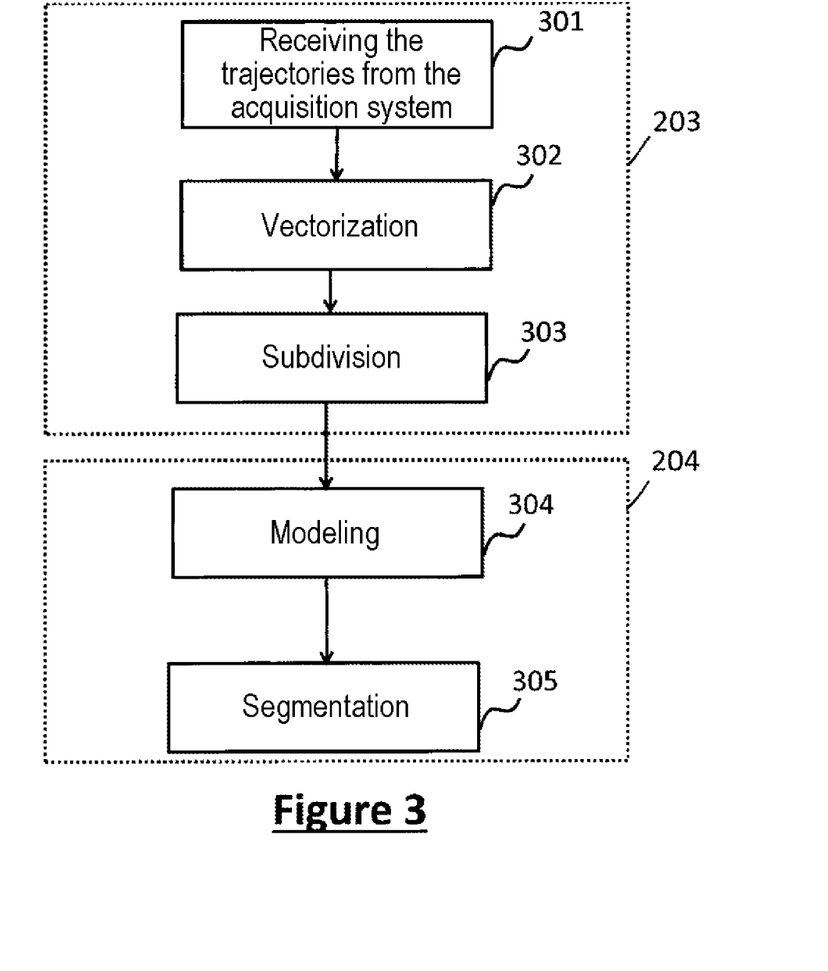
FIG. 3 is a flowchart showing the steps implemented to determine the topology of a railroad network and the modeling of the geometry of the railroad tracks of the network, according to some embodiments of the invention.

FIG. 3 illustrates the steps implemented to generate railroad track segments modeled on the basis of a geolocated and classified measurement point cloud, associated with the ground and with the railroad tracks according to some embodiments of the invention, Such steps correspond to steps 203 and 204 in FIG. 2. The point cloud can be measured by a mobile topography system associated with an inertial unit. The coordinates of the measurement points can be organized in geolocation files having the structure of a GPS/GNSS trace. Each geolocation file can contain a set of data fully describing the coordinates of the measurement points associated with a railroad. Coordinates of secondary railroads can be described separately in other geolocation files.

In step 301, geolocated measurement points associated with the ground and with the railroad tracks and positions of the junctions and of the stopping points on the railroad tracks are received.

In step 302, the geolocated measurement points received are transformed into one or more geospatial vectors. Each geospatial vector may be associated with a railroad track and may comprise the coordinates in three dimensions of a predefined number of points on the rails of the associated railroad track. Alternatively, each geospatial vector may comprise the coordinates in three dimensions of a predefined number of points on the median axis of the associated railroad track. The spacing between the points on the rails or from the median axis may be constant. The geospatial vector may further comprise heading, slope and cant measurements associated with each of the points on the rails or the median axis of the railroad track. Step 302 can be implemented by applying a vision algorithm executed on a local computer or on a cloud computing service.

In step 303, geospatial vectors associated with the various railroad tracks are subdivided in order to identify other elements of the railroad network comprising junctions and stopping points. Such elements may be identified based on their coordinates provided by step 301. The subdivision step 303 may further comprise the construction of a graph representing the topology of the railroad network. The graph may comprise a set of edges, nodes connecting the edges, and leaf nodes connected to a single edge. The edges of such a graph may represent segments of railroad tracks that are associated with geospatial vectors and the nodes may represent junctions or stopping points (leaf nodes) in the railroad network. In the subdivision step 303, the railroad track segments connected to each of the nodes (junctions and stopping points) of the railroad network, as well as the segments associated with each of the railroads may, for example, be determined.

In step 304, the geometry of the railroad tracks of the rail network, represented by the geospatial vectors, can be modeled using analytical equations. The modeling step 304 may comprise subdividing each geospatial vector of the railroad network into a plurality of segments in order to facilitate the modeling. A standard deviation measuring the error between the measured curve of a railroad track and the curve resulting from the analytical equations can be determined. The modeling step 304 may also be configured so that the standard deviation associated with each of the segments of the railroad network is smaller than a predefined modeling error threshold.

In step 305, the segmentation of the railroad network is carried out based on the modeled railroad track segments as well as other elements of the railroad network. Step 305 may, for example, comprise defining the direction of switching in each of the junctions of the railroad network and a direction of travel of mobile vehicles on each of the modeled segments of the railroad tracks. Step 305 may also comprise saving the elements of the railroad network as well as the format of the network in description files having a chosen description format (such as XML format for example).

Figure 4:
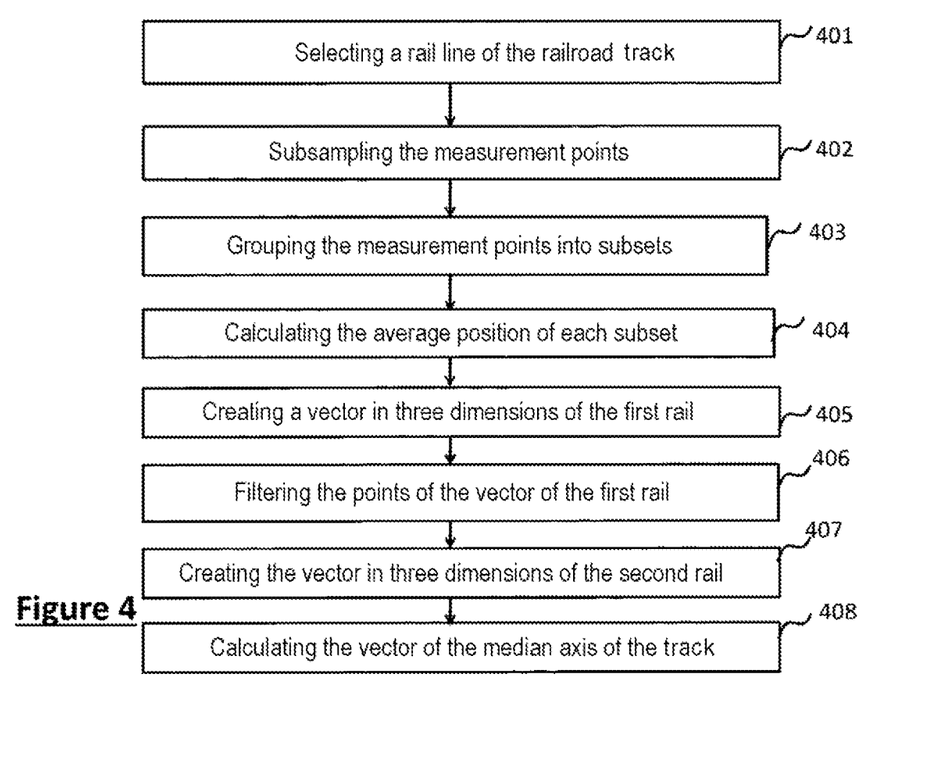
FIG. 4 is a flowchart showing the steps implemented to determine geospatial vectors based on a geolocated and classified measurement point cloud, according to some embodiments of the invention.

FIG. 4 is a flowchart showing the steps implemented to create a geospatial vector based on a geolocated and classified measurement point cloud, associated with the ground and with the railroad tracks according to some embodiments of the invention. In such an embodiment, the geospatial vector represents the median axis of a railroad track designating a guide track for a railroad vehicle such as a train comprising two lines of rails whose spacing is kept constant by securing to crosspieces. According to other embodiments of the invention, the geospatial vector may represent one or more rail lines of the railroad track.

In step 401, one of the rail lines of each railroad track is selected by analyzing the associated measurement points and their coordinates as provided by the geolocation file of the measurement point cloud. For a railroad track comprising two lines of rails, the right-hand rail defined with respect to the direction of movement of the mobile vehicle may, for example, be selected. The rest of the description will be provided with reference to such an example of rail line selection by way of non-limiting example.

The measurement points associated with the selected rail line are then subsampled in step 402. The subsampling factor may be of the order of about ten points. Such an order of magnitude of the subsampling factor constitutes a trade-off between measurement precision and calculation complexity.

In step 403, the subsampled measurement points are grouped into subgroups of subsampled measurement points such that two successive subgroups of subsampled measurement points share at least one measurement point. Such an overlap between the subgroups of measurement points ensures the continuity of the measurements that will be extracted.

In step 404, a moving average is applied to the subgroups of subsampled measurement points in order to calculate for each of the subgroups an average position in three dimensions. Such an average position may be defined in the same measurement reference frame as that associated with the geolocated measurement point cloud.

In step 405, a geospatial vector representing the right-hand track of the railroad track is created by grouping together the calculated average positions in three dimensions while observing the order in which the positions are obtained.

In step 406, the geospatial vector thus obtained is filtered so as to eliminate the positions resulting from measurement points likely to be affected by noise from automated classification.

In step 407, the measurement points associated with the left-hand rail line of the railroad track are analyzed in a similar manner as for the right-hand rail line of the same railroad track, in order to determine a second geospatial vector representing the left-hand line.

In step 408, the geospatial vector representing the median axis of the railroad is determined based on the geospatial vectors representing the associated left- and right-hand rail lines. The coordinates of the median axis of the railroad can be calculated by taking the average between the points of the right- and left-hand rail vectors.

Figure 5:
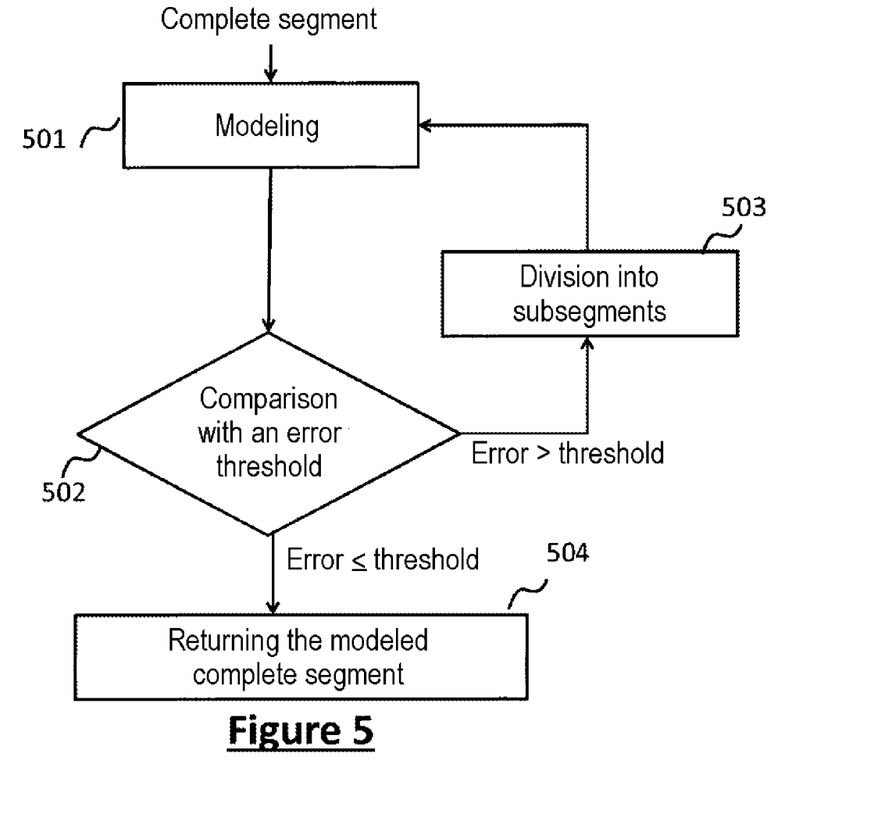
FIG. 5 is a flowchart showing the steps implemented to model the geometry of a segment of a railroad, according to some embodiments of the invention.

FIG. 5 is a flowchart showing the modeling method implemented to model a geospatial vector representing a railroad track using one or more analytical equations. The modeling method may comprise one or more iterations of a set of modeling steps and may receive a modeling error threshold defined per unit length. The analytical equations that can be used to model the geometry of the central axis of a railroad track may correspond to a set of basic geometric shapes such as a straight line, a circular arc and a clothoid. In practice, the shape of a railroad track can be approximated to one of the basic geometric shapes even if an exact correspondence is not obtained. A modeling error that may be of mean quadrature type may be associated with this correspondence.

In step 501 of the modeling method, a geospatial vector representing a railroad track is received in order to be modeled using one of the basic geometric shapes identified. The basic geometric shape retained to model a geospatial vector is that associated with a minimum modeling error. Step 501 may also be configured to provide, for each geospatial vector modeled, parameters comprising the geometric shape retained, the parameters of the analytical equation allowing the geometry of the geospatial vector to be fitted closer to the geometric shape retained and the modeling error associated with such fitting.

In step 502 of the modeling method, the modeling error as provided by modeling step 501 is compared with a modeling threshold. Such a modeling threshold can be determined by multiplying the modeling threshold per unit length and the length of the railroad track represented by the geospatial vector. The iterations of the modeling method can be stopped if the modeling threshold is greater than the modeling error.

In step 503, the modeled geospatial vector having a modeling error greater than the modeling threshold is divided into two segments which may have the same length. Each of the two segments can be modeled in a manner similar to the complete geospatial vector according to an iterative approach consisting in dividing into two subsegments each segment having a modeling error greater than the modeling error threshold. The method for modeling a geospatial vector representing a railroad provides a plurality of segments, each of which is modeled using an analytical equation observing a modeling error threshold.

Figure 6:
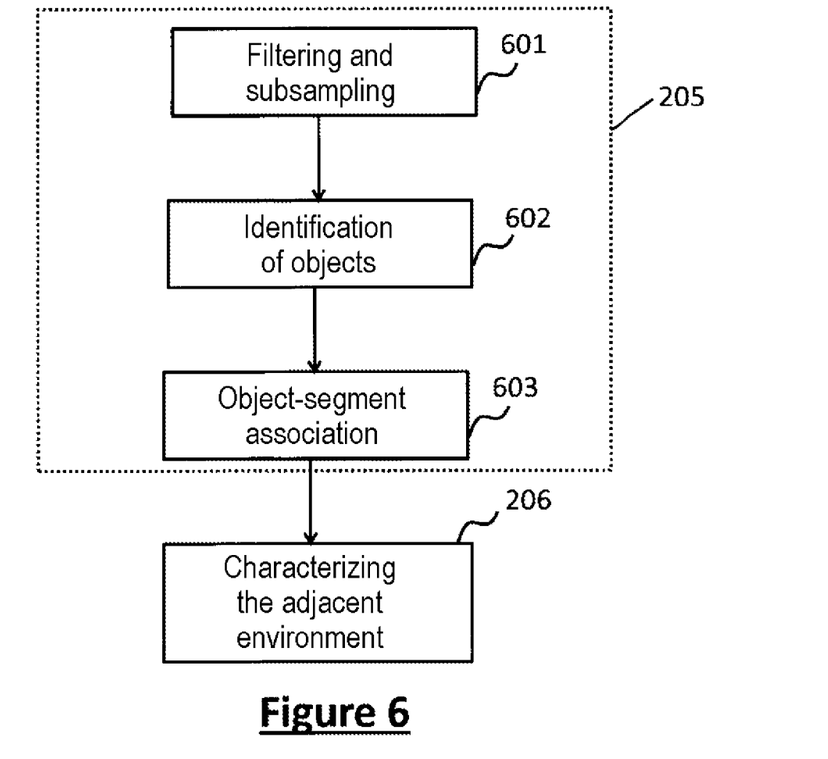
FIG. 6 is a flowchart showing the steps implemented to achieve an association between modeled railroad track segments and objects of the adjacent environment, according to some embodiments of the invention.

FIG. 6 illustrates the steps implemented to identify and associate with the modeled segments objects adjacent to the railroad network that are likely to interfere with navigation signals received by a mobile vehicle moving on the modeled railroad track segments of the railroad network, according to one embodiment of the invention.

In step 601, the geolocated and classified measurement point cloud associated with the environment adjacent to the railroad network is filtered according to predefined filtering criteria. Such a filtering operation makes it possible, for example, to eliminate measurement points corresponding to adjacent objects of low height relative to the height of the mobile vehicle receiving navigation signals. The risk of adjacent objects of low height interfering with navigation signals can be ignored. Step 601 may further comprise a subsampling operation applied to the measurement points associated with adjacent objects whose height is of the same order of magnitude as the height of the mobile vehicle. The subsampling factor can be chosen to allow identification of adjacent objects while reducing processing complexity.

In step 602, the filtered and subsampled measurement points are transformed into adjacent objects, the adjacent objects being associated with object parameters such as the geographical location of the object, dimensions (for example, the length, width and/or height), the distance separating the object from the nearest railroad track, and/or the relative orientation of the object with respect to the trajectory. The adjacent objects obtained may further be synthesized into a standard geometric figure such as a parallelepiped, cylinder, pyramid, etc.

In step 603, the adjacent objects obtained are associated with railroad track segments of the railroad network. An object may be associated with a railroad track segment if navigation signals received by a mobile vehicle moving on the railroad track segment are likely to be interfered with by the object in question. An adjacent object may therefore be associated with more than one railroad track segment. Railroad track segments might not be associated with any adjacent objects.

In step 704, the main physical phenomenon likely to interfere with navigation signals with respect to each association between a railroad track segment and an adjacent object is determined. Such a physical phenomenon may be, for example, multipath propagation, propagation without direct line of sight between the transmitter and the receiver of navigation signals, scattering, etc. The physical phenomenon responsible for the interference in navigation signals may further be characterized by specifying the geometric parameters relating to the association between the modeled segment and the adjacent object and to the railroad vehicle receiving the navigation signals. Such geometric parameters may include the distance that separates the two elements of the association, the dimensions of the adjacent object and the dimensions of the railroad vehicle.

Figure 7:
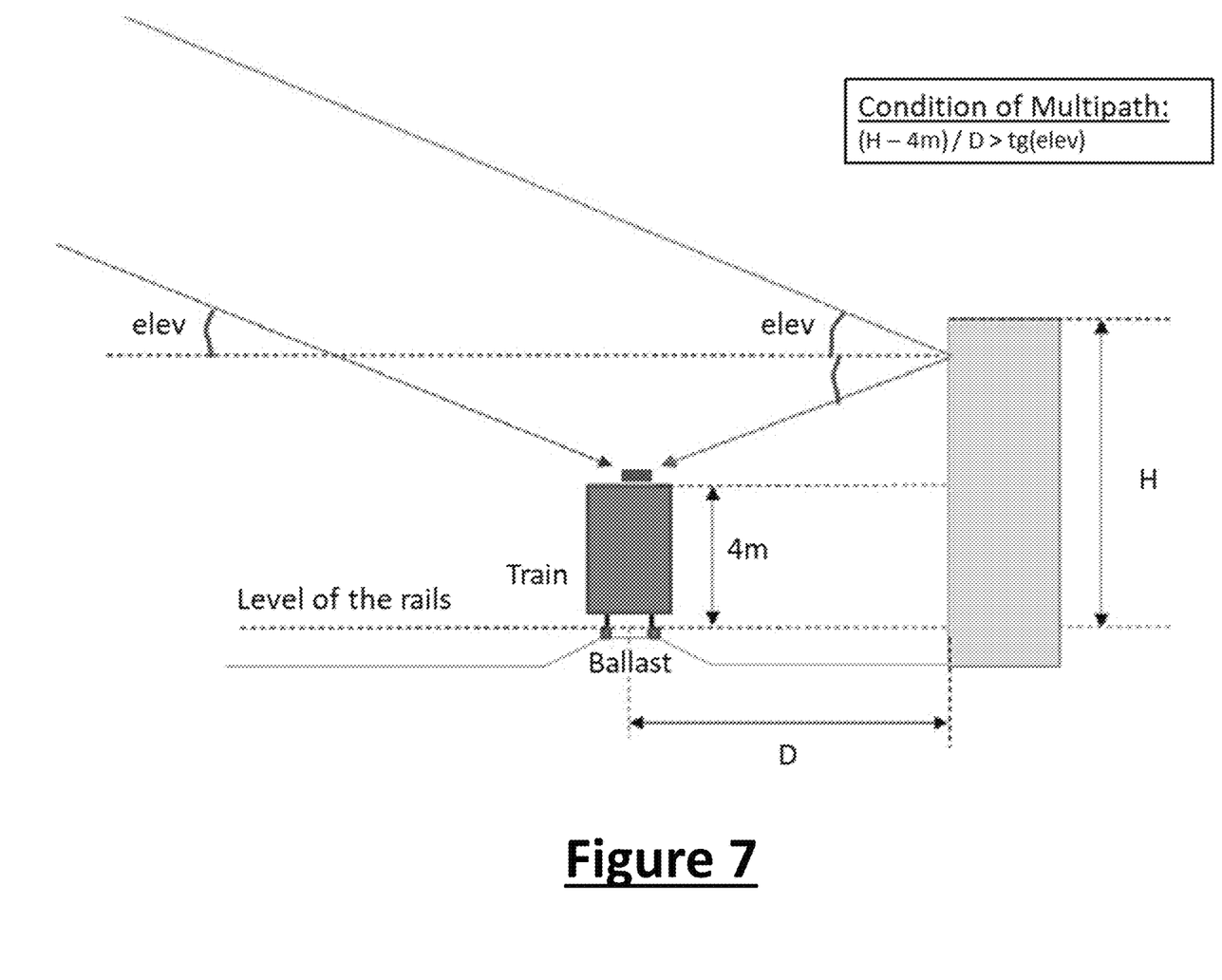
FIGS. 7 and 8 show two examples of association between a modeled railroad track segment and an object of the adjacent environment, according to embodiments of the invention.

FIG. 7 shows an example of an association between a railroad track segment and an adjacent object in which multipath propagation is the main physical phenomenon responsible for the interference in navigation signals. The object is synthesized into a geometric shape of parallelepiped type, of height "H" and separated from the central axis of the subsegment of the railroad track by a distance "D". For a moving vehicle of height "M", the multipath propagation phenomenon can be quantified using a mathematical equation relating the parameters "M" and "D" to the angle of elevation "alpha" between the level of the rails and the direction in which the navigation signal is received. Such an equation can be written in the following form:

$$(H-M)/D > \tan(\alpha) \tag{1}$$

Figure 8:
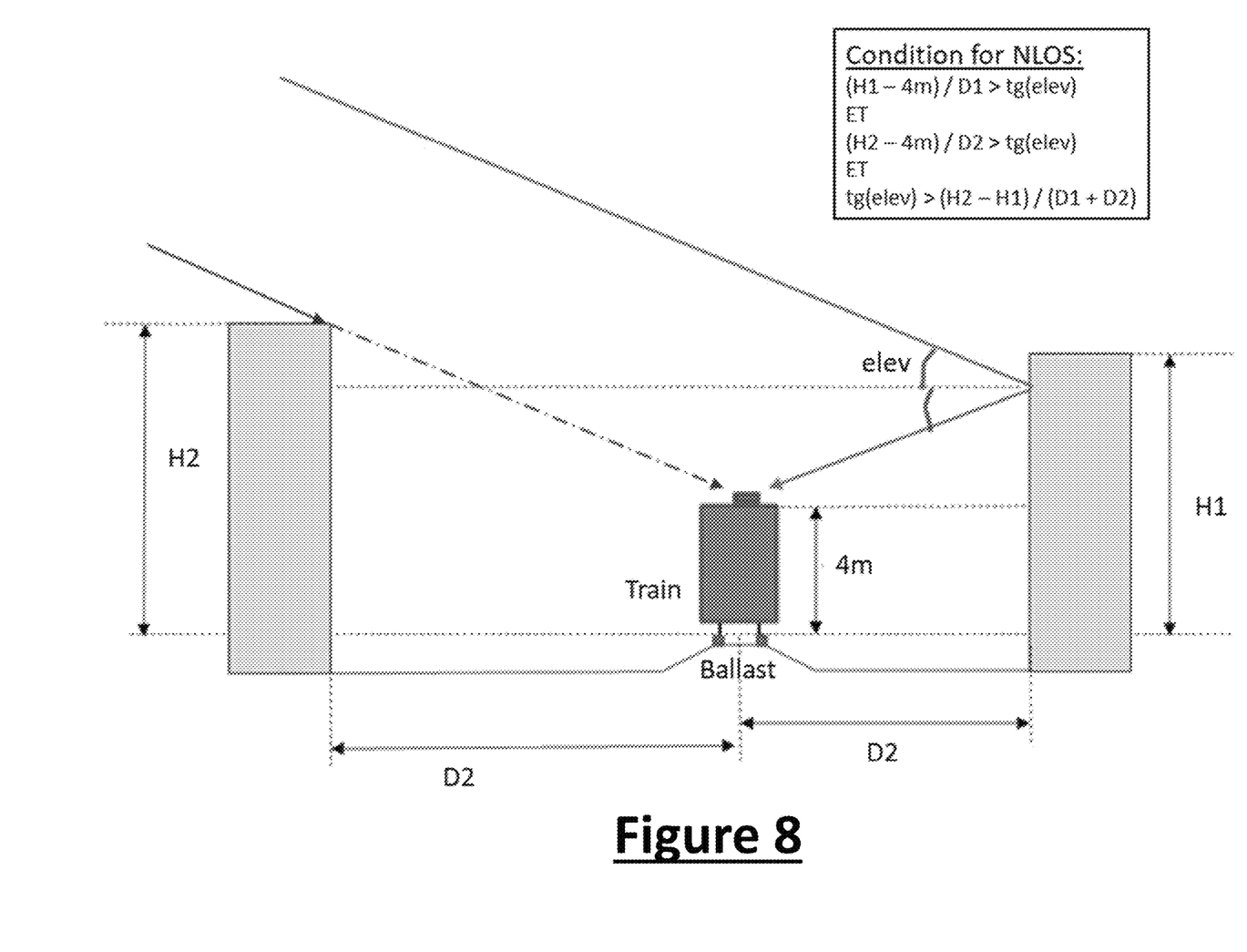

FIG. 8 shows a second example of association in which a railroad track segment is associated with two adjacent objects. In such an association, propagation without direct line of sight between the transmitter and the receiver of navigation signals is the main physical phenomenon responsible for the interference in navigation signals. The two objects implemented in such an association are synthesized into a geometric shape of parallelepiped type. The two adjacent objects have heights H1 and H2 and are separated from the median axis of the segment of the railroad track by respective distances D1 and D2. For a mobile vehicle of height M, the phenomenon of propagation without direct line of sight between the transmitter and the receiver of navigation signals may occur when the angle of elevation as defined above satisfies the following relationships:

$$(H1-4M)/D1 > \tan(\alpha) \; ET \; (H2-4M)/D2 > \tan(\alpha) \; ET \; \tan(\alpha) > (H2-H1)/(D1+D2) \tag{2}$$

Figure 9:
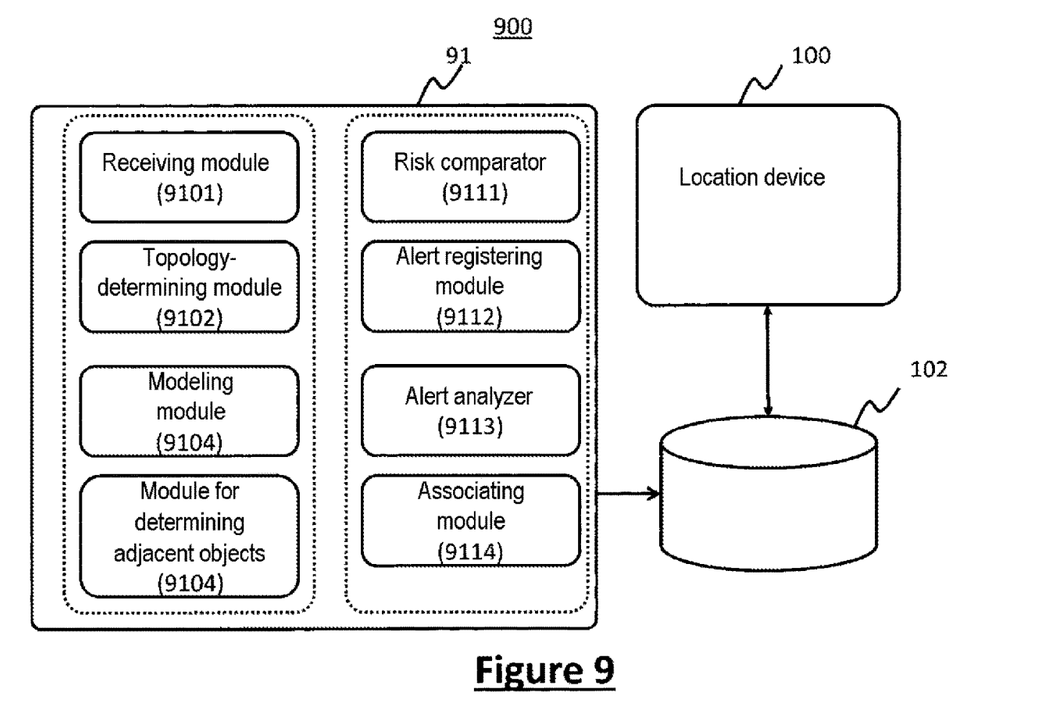
FIG. 9 is a location system according to embodiments of the invention.

FIG. 9 is a diagram showing an autonomous location system 100 for a mobile vehicle traveling on a railroad track of a railroad network implementing the location method, according to one embodiment of the invention.

The autonomous location system 100 may comprise a location device 101 configured for:

determining location parameters associated with the mobile vehicle in a geographical reference frame, determining one or more candidate railroad track segments by querying a cartographic database based on at least some location parameters, and locating the mobile vehicle based on the candidate railroad track segments returned by the cartographic database 102.

The location system 100 may also comprise a unit for generating cartographic databases 91 for generating information or alerts on possible modifications to the database 102 (changes in the environment).

The unit for generating cartographic databases 91 may comprise:

a receiving module 9100 configured to receive a measurement point cloud classified and geolocated in a coordinate system, said measurement point cloud being associated with said railroad network and with said adjacent environment, a topology-determining module 9102 configured to determine the topology of said railroad network based on geolocated and classified measurement points associated with said railroad network and a plurality of additional elements of said railroad network, a modeling module 9104 configured to model the geometry of the railroad tracks of said railroad network as a plurality of modeled railroad track segments, a module for determining adjacent objects 9106 configured to determine, from geolocated and classified measurement points associated with said adjacent environment, one or more adjacent objects, each of said adjacent objects being associated with one or more modeled railroad track segments, and an identifying module 9108 configured to identify, for each association between an adjacent object and one or more modeled railroad track segments, information representing the interference affecting said navigation signals.

In one embodiment, the unit for generating cartographic databases 91 may further comprise:

a comparator 9111 capable of determining changes in the level of risk 704 associated with the railroad network and with the adjacent environment. Such a comparator 9111 may in particular signal elements of the cloud of geolocated points associated with the adjacent environment as a plurality of adjacent objects likely to interfere with the navigation signals;

an alert registering module 9112 capable of detecting the change in level of risk (704) in the database;

an alert analysis module 9113 capable of qualifying the alert through redundancy of measurements 9112;

an associating module 9114 capable of associating the confirmed alerts 9113 with at least one of the modeled segments 102.

The embodiments of the invention thus make it possible to reconstruct the geometry and the topology of a railroad network based on a geolocated and classified measurement point cloud. They also make it possible to qualify the risks related to the 3D nature of the environment adjacent to the railroad network, by transforming the 3D measurements of a classified point cloud and its trace (GPS/GNSS) into 3D geospatial vectors for semiautomated large-scale production, without the need for a step of drawing or manual guidance using CAD software.

Those skilled in the art will understand that the systems or subsystems according to the embodiments of the invention may be implemented in numerous ways by hardware, software or a combination of hardware and software, notably in the form of program code that may be distributed in the form of a program product, in numerous forms. In particular, the program code may be distributed using computer-readable media, which may include computer-readable storage media and communication media. The methods described in the present description may notably be implemented in the form of computer program instructions able to be executed by one or more processors in an information technology computer device. These computer program instructions may also be stored in a computer-readable medium.

Moreover, the invention is not limited to the embodiments described above by way of non-limiting example. It encompasses all of the variant embodiments that may be contemplated by those skilled in the art.

The invention claimed is:

1. A method for locating, in a railroad reference frame, a mobile vehicle traveling on railroad tracks of a railroad network, comprising the steps of:

determining location parameters associated with the position of the mobile vehicle in a geographical reference frame based on a plurality of navigation signals received by said mobile vehicle, determining one or more railroad track segments on which the mobile vehicle is likely to be located by querying a cartographic database based on at least one of the location parameters, locating the mobile vehicle based on the railroad track segments provided by the cartographic database and at least one of the location parameters, said cartographic database comprising data representing a vectorial description of at least one railroad track of the railroad network and data representing a description of one or more objects of the environment adjacent to the railroad tracks of the railroad network likely to interfere with the navigation signals received by said mobile vehicle, the method comprising a step of generating said cartographic database comprising the steps of:

receiving a measurement point cloud classified and geolocated in a coordinate system, said measurement point cloud being associated with said railroad network and with said adjacent environment, determining the topology of said railroad network based on geolocated and classified measurement points associated with said railroad network and a plurality of additional elements of said railroad network, modeling the geometry of the railroad tracks of said railroad network as a plurality of modeled railroad track segments, said step of modeling the geometry of the median axis of a railroad track represented by a geospatial vector comprising one or more iterations of the following steps:

i. determining a current analytical model of the geometry of the median axis of the railroad track represented by a geospatial vector using at least one analytical equation, ii. measuring the standard deviation between the median axis of the railroad track and the associated curve returned by the analytical model, iii. dividing the geospatial vector into two elements, if the measured standard deviation is greater than a predefined error threshold, steps i. to iii. being iterated for as long as a standard deviation between the analytical model and the geospatial vector is greater than the predefined error threshold; and determining, from geolocated and classified measurement points associated with said adjacent environment, one or more adjacent objects, each of said adjacent objects being associated with one or more modeled railroad track segments, identifying, for each association between an adjacent object and one or more modeled railroad track segments, information representing the interference affecting said navigation signals.

2. The method as claimed in claim 1, further comprising a step of saving the elements comprising the modeled railroad track segments, the additional elements of the railroad network, and/or the adjacent objects in files having a given representation format.

3. The method as claimed in claim 1, wherein said additional elements of the railroad network comprise junctions and stopping points.

4. The method as claimed in claim 1, wherein the geolocated and classified measurement point cloud is received from at least one mobile topography system associated with a hybrid geolocation system comprising a location device associated with an inertial unit.

5. The method as claimed in claim 1, wherein said location parameters comprise a position in three dimensions, a movement speed and/or an orientation parameter.

6. The method as claimed in claim 1, wherein said step of determining the topology of the railroad network comprises the steps of:

transforming elements of said geolocated point clouds associated with said railroad network into a plurality of geospatial vectors, each of the geospatial vectors corresponding to a railroad track, subdividing said railroad network by defining, for each geospatial vector, a plurality of elements comprising junctions and/or stopping points.

7. The method as claimed in claim 6, wherein each railroad track comprises two lines of rails, and in that the step of vectorizing said geolocated and classified measurement point cloud associated with the ground and with the railroad tracks as a plurality of geospatial vectors comprises the steps of:

identifying the points of said geolocated point cloud that are associated with a chosen rail line of the railroad track, subsampling said identified points using a predefined subsampling factor, grouping the subsampled points into a plurality of subsets of points, two successive subsets of points sharing at least one measurement point, calculating the average position in three dimensions of each subset of points using a moving average, creating a vector associated with the chosen rail line comprising the calculated average positions in three dimensions, eliminating those components of the created vector which are likely to be affected by noise from an automated classification, which provides a geospatial vector, determining the one or more vectors associated with the other rail line of the railroad based on the geospatial vector determined for the selected rail, and calculating the geospatial vector associated with the median axis of the railroad track.

8. The method as claimed in claim 7, wherein each geospatial vector further comprises orientation, slope and cant measurements extracted from each subset of identified points.

9. The method as claimed in claim 6, wherein the subdivision step uses a graph comprising a set of edges, and nodes connecting the edges, the edges representing railroad tracks associated with geospatial vectors and the nodes representing junctions or stopping points on the rail network.

10. The method as claimed in claim 1, further comprising determining a network format corresponding to said railroad network by associating each modeled railroad track segment with one or more elements of the railroad network.

11. The method as claimed in claim 1, wherein the step of defining adjacent objects and of associating between an adjacent object and one or more modeled segments comprises the steps of:

subsampling the measurement points associated with the adjacent environment by a predefined subsampling factor, transforming the subsampled measurement points into one or more adjacent objects, associating the adjacent objects with the modeled railroad track segments.

12. The method as claimed in claim 1, wherein navigation signal propagation properties are assigned to each association between an adjacent object and one or more modeled segments as a function of a plurality of parameters comprising the height of the adjacent object and the distance separating the adjacent object from the median axis of the modeled segment.

13. A system for locating, in a railroad reference frame, a mobile vehicle traveling on railroad tracks of a railroad network, comprising a location device configured for:
  determining location parameters associated with the position of the mobile vehicle in a geographical reference frame based on a plurality of navigation signals received by said mobile vehicle,
  determining one or more railroad track segments on which the mobile vehicle is likely to be located by querying a cartographic database based on at least one of the location parameters, and
  locating the mobile vehicle based on the railroad track segments provided by the cartographic database and at least one of the location parameters;
  wherein said cartographic database comprises data representing a vectorial description of at least one railroad track of the railroad network and data representing a description of one or more objects of the environment adjacent to the railroad tracks of the railroad network likely to interfere with said navigation signals received by said mobile vehicle, and in that the location system further includes a unit for generating cartographic databases comprising:
    a receiving module configured to receive a measurement point cloud classified and geolocated in a coordinate system, said measurement point cloud being associated with said railroad network and with said adjacent environment,
    a topology-determining module configured to determine the topology of said railroad network based on geolocated and classified measurement points associated with said railroad network and a plurality of additional elements of said railroad network,
    a modeling module configured to model the geometry of the railroad tracks of said railroad network as a plurality of modeled railroad track segments, said modeling comprising:
      i. a determination of a current analytical model of the geometry of the median axis of the railroad track represented by a geospatial vector using at least one analytical equation,
      ii. a measurement of the standard deviation between the median axis of the railroad track and the associated curve returned by the analytical model,
      iii. a division of the geospatial vector into two elements, if the measured standard deviation is greater than a predefined error threshold, reiteration of said determination (i), said measurement (ii) and said division
    iii) as long as a standard deviation between the analytical model and the geospatial vector is greater than the predefined error threshold;
    a module for determining adjacent objects configured to determine, from geolocated and classified measurement points associated with said adjacent environment, one or more adjacent objects, each of said adjacent objects being associated with one or more modeled railroad track segments; and
    an identifying module configured to identify, for each association between an adjacent object and one or more modeled railroad track segments, information representing the interference affecting said navigation signals.

* * * * *